R. HOFFMANN.
PROCESS AND APPARATUS FOR THE MANUFACTURE OF GLASS DRUMS AND OTHER HOLLOW BODIES.
APPLICATION FILED FEB. 2, 1910.
1,021,043.
Patented Mar. 26, 1912.
2 SHEETS—SHEET 1.
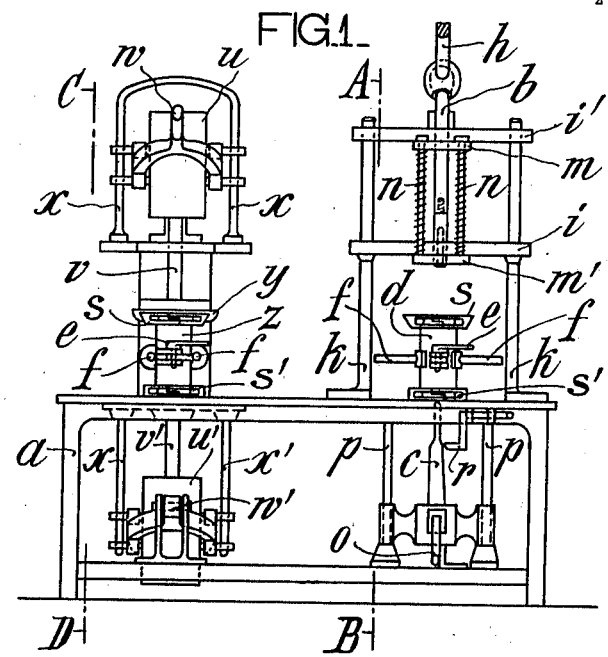
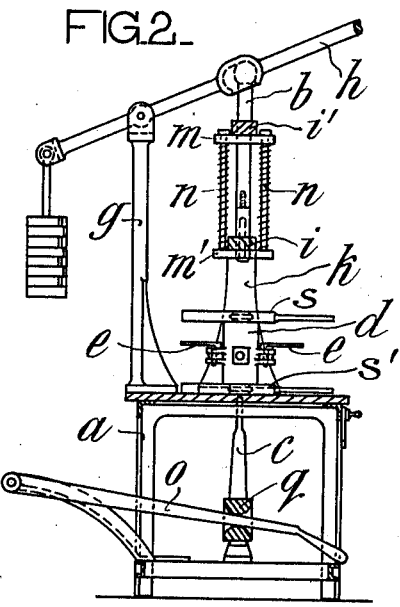
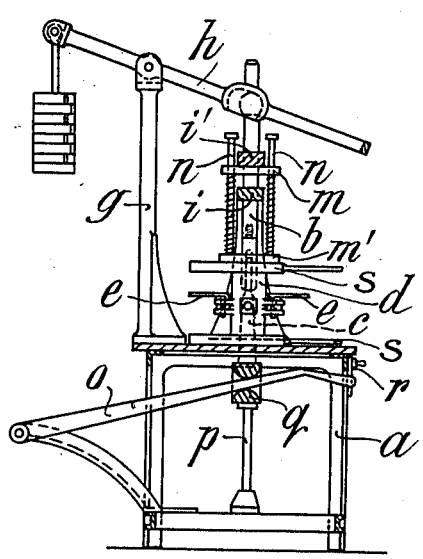
WITNESSES:
INVENTOR,
RUDOLF HOFFMANN,
ATTORNEY.

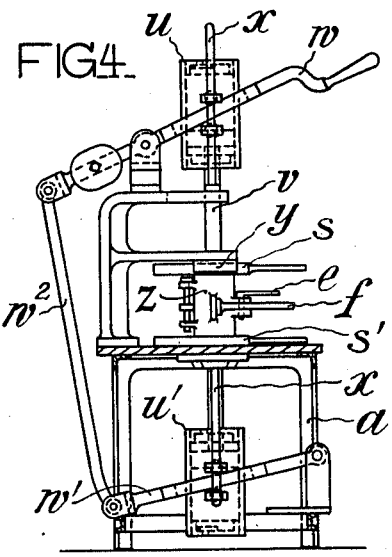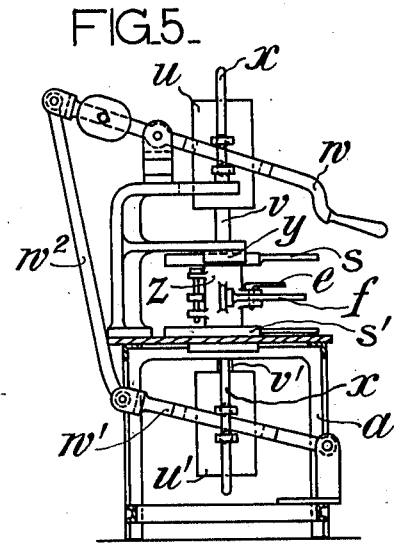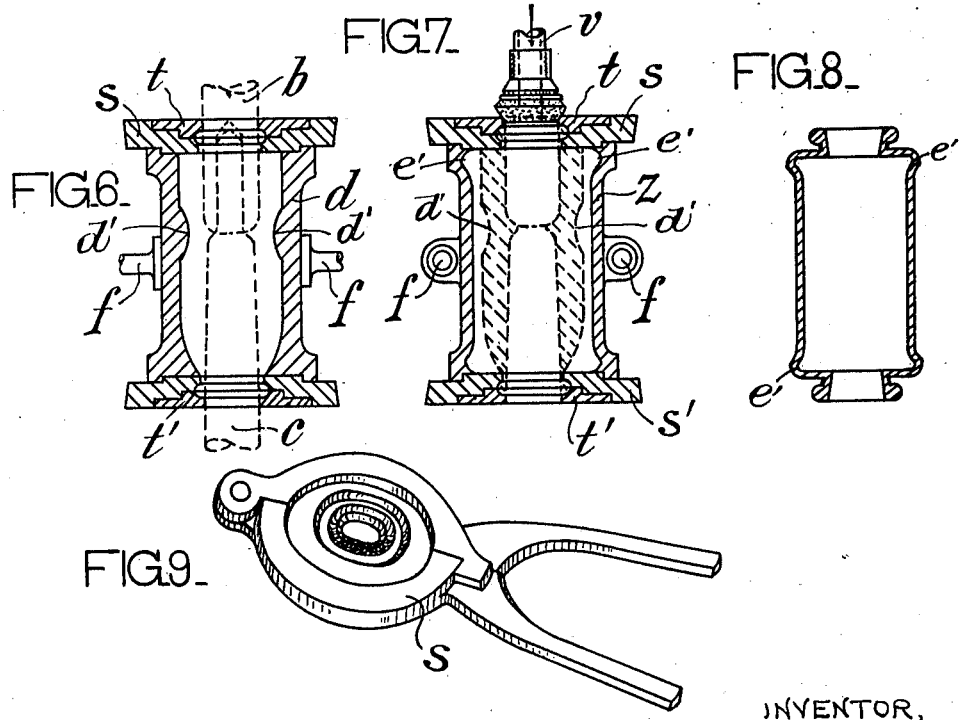

UNITED STATES PATENT OFFICE.

RUDOLF HOFFMANN, OF KÖPENICK, NEAR BERLIN, GERMANY.

PROCESS AND APPARATUS FOR THE MANUFACTURE OF GLASS DRUMS AND OTHER HOLLOW BODIES.

1,021,043.

Specification of Letters Patent.    Patented Mar. 26, 1912.

Application filed February 2, 1910. Serial No. 541,621.

*To all whom it may concern:*

Be it known that I, RUDOLF HOFFMANN, glassmaker, a subject of the King of Prussia, residing at Köpenick, near Berlin, in the Kingdom of Prussia and Empire of Germany, have invented new and useful Improvements in the Process and Apparatus for the Manufacture of Glass Drums and other Hollow Bodies, of which the following is a specification.

It has been the practice hitherto to manufacture by hand the glass drums or glass rollers upon which silk is wound in the silk spinning industry, the glass drum or roller being blown by means of a blow-pipe. This method of manufacture necessitates various finishing operations, is inconvenient and involves loss of time.

The object of the present invention is to manufacture the glass drums or rollers by machinery and to deliver them from the machine in a finished state, thereby dispensing with any supplementary finishing operations. The manufacture is thus considerably simplified, and the cost of production is reduced.

The invention is not confined to the manufacture of glass drums, but includes the manufacture of other hollow glass bodies.

The invention consists in first placing molten glass into a hollow mold provided with movable cores, this mold having the primary shape of the object to be manufactured, and while still in the warm condition the hollow body thus formed is then placed in a mold having a larger interior diameter, wherein the article is blown into its finished state for the whole of its length.

In order to be able to blow upon the hollow body for the whole of its length, the cores are formed, so as to inter-engage, consequently there is no wall formed between the two cores which would prevent the hollow body being blown for the whole of its length.

Referring now to the accompanying drawings, which illustrate by way of example, a form of apparatus by which the process may be carried into effect, Figure 1 is a front elevation of the apparatus, Figs. 2 and 3 are sectional side elevations, the sections being taken on the line A—B, with the device in two different positions. Figs. 4 and 5 are similar sectional views of Fig. 1, taken on the line C—D, the device being likewise shown in two different positions. Fig. 6 is a vertical section of the mold used for the primary formation of a glass drum. Fig. 7 illustrates a vertical section of the second mold, which has a larger interior diameter. Fig. 8 is a vertical section of the finished glass drum. Fig. 9 illustrates in perspective the upper lid of the mold.

Within a common frame $a$, are arranged the devices for the primary formation and the blowing of the hollow glass body. The first mentioned device is provided with two movable cores $b$ and $c$, adapted to be guided into the primary mold $d$, which rests on the frame $a$. The primary mold $d$, is constructed in two parts, and is held together by means of pins $e$, provided with handles, these pins being inserted in the side flanges of the mold. Two rods, $f\,f$ are arranged opposite each other on the mold $d$, these rods serving for carrying the body. The cores $b$ and $c$, are fitted so as to be capable of sliding in a longitudinal direction, and for this purpose the upper core $b$ is carried by a hand lever $h$, this lever being pivotally mounted on a standard $g$. The hand lever $h$ is usually kept in its upper position by means of balance weights attached thereto. The core $b$ is guided by a rigid cross arm $i$, fixed to two pillars $k$, arranged on the frame $a$, while another cross arm $i'$, is rigidly connected to the core $b$ and is guided by the pillars $k$. The lower part of the upper core $b$ is made so as to be removable, in order that when desired by the insertion of another piece, another core may be formed. Further there is fastened to the core $b$, a plate $m$, guided on four rods $n$, a plate $m'$ being fastened to the lower end of the rods $n$. On the rods $n$ there are arranged helical springs. The lower core $c$ is moved by means of a hand lever $o$, pivotally mounted in the frame $a$. The core $c$ is guided in a manner somewhat similar to that of the upper core, by means of a cross arm $q$, sliding on two vertical rods $p$, $p$. The hand lever $o$ can be fastened in its upper position by means of a movable locking bolt $r$, (Fig. 2), returning to the lower position by gravity. On the other hand, springs may be arranged on the guide rods, for this purpose.

According to the invention the lower core $c$ is pointed at its upper end, the upper core $b$ being provided with a corresponding recess, wherein the pointed end of the lower core can engage. This end may be exchangeable for the same reason, and purpose as is the case with the lower end of the upper core.

The closing of the mold at the top and bottom is effected by means of covers $s$, $s'$ and disks $t$ $t'$ fitting into the covers (Figs. 6 and 7). The covers $s$ $s'$ may consist of two parts connected with each other in the manner of a pair of scissors (as shown in Fig. 9), so that each cover may be easily opened and shut.

The manufacture of a hollow glass object is effected in the following manner. The primary mold $d$ which in the example illustrated is of such a construction that it can be used for the manufacture of hollow glass drums (Fig. 8) is placed with the lower cover $s'$ together with the disk $t'$ on the machine frame $a$ in the correct position between the pillars $k$. The lower core $c$ is then guided upward by means of the hand lever $o$, and kept in this position by the locking bolt $r$ (Fig. 3). The hot mass of glass is then poured into the mold $d$ and the upper cover $s$ and disk $t$ are affixed to the mold. The core $b$ is then pressed down by means of the hand lever $h$ and slides upon the pointed end of the lower core, the mass of glass being thereby divided, so that the upper flange of the glass drum is formed (Fig. 6). By reason of the cores interengaging, the hollow glass body is provided with an opening for the whole of its length, thus permitting the body to be blown in the subsequent stage for the whole of its length. It is, of course, evident that either the top or the bottom core may be hollow, and the other core provided with the pointed end. The plate $m$ fastened to the upper core $b$ moves down simultaneously with the latter. This plate which is guided on the rods $n$ thereby compresses the springs situated on the rods, whereby the lower plate $m'$ is at the same time moved down and pressed tightly on the upper part $s$, $t$ of the primary mold $d$.

In order to apply the finishing operation to the hollow glass body, after removing the cores $b$ $c$, the primary mold and the parts belonging thereto are placed beneath the blowing device. This device consists of a pump $u$ arranged above the frame $a$, and another pump $u'$, arranged beneath the frame $a$, these pumps being of any desired kind. A hollow tube $v$ or $v'$ leads into the two pump cylinders, both cylinders being controlled by a hand lever $w$ which is connected to the lower pump lever $w'$ by means of a rod $w^2$. A balance weight is arranged on the hand lever $w$ which has for its object, the return of the hand lever into the upper position. The cylinders of the pump are guided by means of cross bars along the vertical rods $x$.

When the primary mold, and its component parts have been placed beneath the blowing device, the upper cover with its sloping side surfaces is pushed into a guide in a plate $y$ the pins $e$ keeping the parts of the mold together are next taken out, and the component parts of the mold are removed. The blowing mold $z$ which has a larger internal diameter than the primary mold $d$ and is likewise in two parts, has been opened already on the one side, and placed on the pump device behind the primary mold, so that immediately the primarily formed hollow body is exposed it may again be inclosed in the blowing form $z$. The parts of the mold $z$ are held together by means of pins $e$, in exactly the same manner as the mold $d$, the two halves of the mold are however always pivotally connected. The carrying arms $f$ are however arranged in a different manner on the mold $z$, so as to enable the two halves to be easily closed. As soon as the mold $z$ has been tightly closed by means of the front bolts $e$, provided with handles, then the blowing device is brought into action by moving the hand lever $w$ up and down. The cylinders of the pump $u$, $u'$ follow this movement, thereby forcing air into the mold $z$. The glass body in the mold $z$, and which has a smaller diameter than the mold is by this means blown out and pressed against the walls of the mold, thus receiving its final shape (Fig. 8). The inwardly extending projections $d'$ (Figs. 6 and 7) are provided in order to assure at the center of the molten glass body an extra amount of glass, so that when the blowing is applied, the thickness of the glass walls may be uniform, besides providing extra glass to round out the corners $e'$. The projections $d'$ are not absolutely necessary, and may be omitted, though for the reasons stated, I prefer to use them.

When the hollow glass body has been blown, the mold is opened and the finished glass drum removed. In the meantime a new glass body may have been formed in the primary mold, so that the manufacture can be carried out comparatively rapidly. In case the work is carried out so that both forms are in use at the same time, then naturally it is necessary to have separate covers $s$ $s'$ with the disks $t$ $t'$ for each form.

The manufacture of other hollow glass bodies is carried out in a similar manner, the shape of the mold and cores of necessity corresponding to those of the object to be manufactured.

Having now described my invention, what I claim as new and desire to secure by Letters Patent is:—

1. An apparatus for the manufacture of hollow glass bodies, the combination of a primary mold, a pair of interengaging cores, and a blowing mold of greater diameter than the primary mold, one of said cores being provided at the engaging end with an axial bore, the other core being provided with a reduced end adapted to be received by said bore.

2. An apparatus for the manufacture of hollow glass bodies, the combination of a primary mold, a pair of interengaging cores, and a blowing mold of greater diameter than the primary mold, one of said cores being provided at the engaging end with an axial bore, the other core being provided with a reduced end adapted to be received by said bore, the engaging ends of the unreduced part of the cores being approximately midway of the mold receiving the cores.

3. A process for the manufacture of hollow glass bodies, said process consisting in introducing a core upwardly into a primary mold, pouring glass into the mold, introducing a second core downwardly into the mold until the cores interengage, whereupon the glass body so formed is placed in a second mold of greater width and blown.

4. A process for the manufacture of glass drums and other hollow bodies, said process consisting in introducing a core upwardly into a mold, placing glass into the mold, introducing a second core downwardly into the mold until the cores engage, removing the mold to a blowing device, removing the mold and cores, inclosing the glass body with a second mold of greater diameter than the first mold, and blowing the glass for its full length against the second mold.

5. An apparatus for manufacturing hollow glass bodies, comprising a primary mold open at both ends, covers for said ends and having apertures, a pair of vertically disposed and vertically movable cores passed through said apertures and engaging each other in said mold, a second mold of greater width than the primary mold, apertured covers for the second mold, and means communicating with the apertures of the covers of the second mold for blowing a hollow glass body therein, said covers of the second mold being adapted to engage the ends of said body at the apertures of the covers.

6. An apparatus for the manufacture of glass drums and other hollow glass bodies, consisting of a bipartite primary glass mold which is open at both ends and provided with closing means having apertures, two cores which can be so far introduced into the primary mold through apertures in the closing means that they interengage, a likewise divided mold of greater width than the first mold, which is open at both ends and provided with apertured covering means, a blowing device which can be attached to the apertures of the closing means of the second mold.

7. An apparatus for the manufacture of glass drums and other hollow bodies consisting of a divided primary mold, which is open at both ends and provided with closing means at said ends, means for closing the primary mold, means to convey the primary mold to the blowing apparatus, two cores which can be introduced from above and from below into the primary mold until they interengage, a second, likewise divided, mold of greater width in the clear than the primary mold and which is open at both ends and provided with apertured closing means, means for closing and carrying forward this second mold, a blowing device the blowing members of which are attached to the apertures of the closing means of the second mold.

8. In an apparatus for the manufacture of glass, the combination of a frame, having a table thereon; a pair of cores vertically disposed and vertically movable and mounted on said frame one above the other, the upper core being disposed above said table and the lower core being disposed below the same and being adapted to pass therethrough; means for guiding said cores; hand levers fulcrumed to the frame and operatively connected to said cores; a plate connected at the upper end of said upper core; resilient means yieldingly pressing on said plate, said upper core being provided at its lower end with an axial bore; said lower core being provided at its upper end with a reduced portion adapted to be received by said bore when said cores are brought together; an openable primary mold provided with means for holding the same closed and adapted to receive said cores when said cores interengage; annular disks adapted to receive said cores; two-part covers for the upper and lower ends of said mold and provided with cut-away portions adapted to receive said disks; pumps disposed above and below said table; tubes leading into the cylinders of each of the pumps, respectively; levers for controlling said pumps, respectively; a link operatively connecting said levers; guide plates at the ends of the said tubes most remote from said pumps; and a blowing mold of a larger diameter than said primary mold, provided with covers at the ends thereof, said covers being adapted to be received into said guide plates.

In testimony whereof I have signed my name to this specification in the presence of two subscribing witnesses.

RUDOLF HOFFMANN.

Witnesses:
 WOLDEMAR HAUPT,
 HENRY HASPER.